United States Patent
Cronin

(10) Patent No.: US 9,395,754 B2
(45) Date of Patent: Jul. 19, 2016

(54) OPTIMIZING MEMORY FOR A WEARABLE DEVICE

(71) Applicant: GRANDIOS TECHNOLOGIES, LLC, Charleston, SC (US)

(72) Inventor: John Cronin, Bonita Springs, FL (US)

(73) Assignee: GrandiOs Technologies, LLC, Charleston, SC (US)

(*) Notice: Subject to any disclaimer, the term of this patent is extended or adjusted under 35 U.S.C. 154(b) by 0 days.

(21) Appl. No.: 14/311,133

(22) Filed: Jun. 20, 2014

(65) Prior Publication Data

US 2015/0355800 A1    Dec. 10, 2015

Related U.S. Application Data

(60) Provisional application No. 62/007,927, filed on Jun. 4, 2014, provisional application No. 62/007,858, filed on Jun. 4, 2014.

(51) Int. Cl.
| | |
|---|---|
| *G06F 9/50* | (2006.01) |
| *G06F 11/34* | (2006.01) |
| *G06F 1/16* | (2006.01) |
| *G06F 3/0484* | (2013.01) |
| *G06F 12/02* | (2006.01) |

(52) U.S. Cl.
CPC .............. *G06F 1/163* (2013.01); *G06F 3/0484* (2013.01); *G06F 11/3409* (2013.01); *G06F 9/5022* (2013.01); *G06F 12/02* (2013.01)

(58) Field of Classification Search
CPC ............ G06Q 30/0267; G06F 19/3406; G06F 1/3203; G06F 11/0742; G06F 1/163; G06F 9/5022; G06F 11/3409; G06F 12/02
USPC .................. 715/740, 748–749, 751–759, 864
See application file for complete search history.

(56) References Cited

U.S. PATENT DOCUMENTS

| | | |
|---|---|---|
| 6,285,757 B1 | 9/2001 | Carroll et al. |
| 6,477,117 B1 | 11/2002 | Narayanaswami et al. |

(Continued)

FOREIGN PATENT DOCUMENTS

| | | |
|---|---|---|
| WO | WO 2005/103867 | 11/2005 |
| WO | WO 2012/2110527 | 8/2012 |

(Continued)

OTHER PUBLICATIONS play.google.com, "Memory Usage Plus—Android Apps on Google Play", Sep. 14, 2013, as evidenced by the Internet Archive at https://web.archive.org/web/20130914142433/https://play.google.com/store/apps/details?id=com.twistbyte.memoryusageplus.*

(Continued)

*Primary Examiner* — Andrew Tank
(74) *Attorney, Agent, or Firm* — Polsinelli LLP

(57) ABSTRACT

Systems and methods for optimizing memory for a wearable device are provided. A selection may be received from a user via a user interface of a wearable device. Such user selection may indicate an application. Application data associated with the selected application may be identified as being located at another device selected from a plurality of other devices. The application data may then be retrieved from the selected device over a communication network. A display may be generated and displayed on the user interface of the wearable device. Such display may be based on the retrieved application data and associated with execution of the selected application.

20 Claims, 10 Drawing Sheets

(56) References Cited

U.S. PATENT DOCUMENTS

| | | | |
|---|---|---|---|
| 6,556,222 B1 | 4/2003 | Narayanaswami | |
| 6,678,535 B1 | 1/2004 | Narayanaswami | |
| 6,720,860 B1 | 4/2004 | Narayanaswami | |
| 6,757,719 B1* | 6/2004 | Lightman et al. | 709/219 |
| 7,477,890 B1* | 1/2009 | Narayanaswami | 455/414.1 |
| 7,506,269 B2 | 3/2009 | Lang | |
| 7,835,689 B2* | 11/2010 | Goldberg et al. | 455/3.06 |
| 8,244,283 B1 | 8/2012 | Booth | |
| 8,355,711 B2 | 1/2013 | Heins et al. | |
| 8,478,937 B2 | 7/2013 | Grube et al. | |
| 8,510,808 B2 | 8/2013 | McNeil et al. | |
| 8,514,086 B2* | 8/2013 | Harper et al. | 340/573.1 |
| 8,562,489 B2* | 10/2013 | Burton et al. | 482/9 |
| 8,589,667 B2 | 11/2013 | Mujtaba et al. | |
| 8,611,930 B2 | 12/2013 | Louboutin et al. | |
| 8,620,344 B2 | 12/2013 | Huang et al. | |
| 8,620,353 B1 | 12/2013 | Kahn et al. | |
| 8,626,465 B2 | 1/2014 | Moore et al. | |
| 8,627,019 B2 | 1/2014 | Yang | |
| 8,630,216 B2 | 1/2014 | Deivasigamani et al. | |
| 8,660,501 B2 | 2/2014 | Sanguinetti | |
| 8,706,044 B2 | 4/2014 | Chang et al. | |
| 8,724,723 B2 | 5/2014 | Panicker et al. | |
| 8,725,842 B1 | 5/2014 | Al-Nasser | |
| 8,744,804 B2* | 6/2014 | Messenger et al. | 702/160 |
| 8,750,207 B2 | 6/2014 | Jeong et al. | |
| 8,751,457 B2* | 6/2014 | Grigg et al. | 707/667 |
| 8,758,201 B2* | 6/2014 | Ashby et al. | 482/8 |
| 8,787,006 B2 | 7/2014 | Golko et al. | |
| 8,793,094 B2 | 7/2014 | Tam et al. | |
| 8,816,868 B2 | 8/2014 | Tan et al. | |
| 8,831,529 B2 | 9/2014 | Toh et al. | |
| 8,831,655 B2 | 9/2014 | Burchill et al. | |
| 8,836,851 B2 | 9/2014 | Brunner | |
| 8,843,158 B2 | 9/2014 | Nagaraj | |
| 8,849,308 B2 | 9/2014 | Marti et al. | |
| 8,862,060 B2 | 10/2014 | Mayor | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 8,965,348 B1 | 2/2015 | Cronin | |
| 2002/0068604 A1* | 6/2002 | Prabhakar et al. | 455/556 |
| 2004/0006551 A1* | 1/2004 | Sahinoja et al. | 707/1 |
| 2005/0066281 A1* | 3/2005 | Abbott et al. | 715/740 |
| 2007/0039025 A1 | 2/2007 | Kraft et al. | |
| 2008/0168235 A1* | 7/2008 | Watson et al. | 711/135 |
| 2010/0199232 A1* | 8/2010 | Mistry et al. | 715/863 |
| 2011/0197237 A1 | 8/2011 | Turner | |
| 2012/0077536 A1 | 3/2012 | Goel et al. | |
| 2012/0179882 A1* | 7/2012 | Bernhard et al. | 711/156 |
| 2012/0216035 A1 | 8/2012 | Leggette et al. | |
| 2012/0316932 A1* | 12/2012 | Rahman et al. | 705/14.1 |
| 2012/0324198 A1 | 12/2012 | Spradlin et al. | |
| 2012/0326673 A1 | 12/2012 | Li et al. | |
| 2012/0326873 A1 | 12/2012 | Utter | |
| 2013/0007343 A1* | 1/2013 | Rub et al. | 711/103 |
| 2013/0040617 A1 | 2/2013 | Lee et al. | |
| 2013/0151622 A1 | 6/2013 | Goel et al. | |
| 2013/0185492 A1* | 7/2013 | Weksler et al. | 711/105 |
| 2013/0197679 A1* | 8/2013 | Balakrishnan et al. | 700/91 |
| 2013/0205219 A1 | 8/2013 | Moha et al. | |
| 2013/0216065 A1 | 8/2013 | Nguyen | |
| 2013/0225087 A1 | 8/2013 | Uhm | |
| 2013/0273879 A1 | 10/2013 | Eisen et al. | |
| 2013/0303192 A1 | 11/2013 | Louboutin | |
| 2013/0317835 A1 | 11/2013 | Mathew | |
| 2013/0326168 A1 | 12/2013 | Chang et al. | |
| 2013/0328917 A1 | 12/2013 | Zambetti et al. | |
| 2013/0331087 A1 | 12/2013 | Shoemaker | |
| 2013/0331118 A1 | 12/2013 | Chhabra | |
| 2013/0331137 A1 | 12/2013 | Burchill | |
| 2013/0332108 A1 | 12/2013 | Patel | |
| 2013/0332156 A1 | 12/2013 | Tackin | |
| 2013/0332841 A1 | 12/2013 | Gallet et al. | |
| 2013/0332854 A1 | 12/2013 | Roman et al. | |
| 2013/0335340 A1 | 12/2013 | Smith | |
| 2014/0006540 A1 | 1/2014 | Rao et al. | |
| 2014/0062773 A1 | 3/2014 | MacGougan | |
| 2014/0065962 A1 | 3/2014 | Le | |
| 2014/0071221 A1 | 3/2014 | Dave | |
| 2014/0105084 A1 | 4/2014 | Chhabra | |
| 2014/0135960 A1 | 5/2014 | Choi | |
| 2014/0139380 A1 | 5/2014 | Ouyang | |
| 2014/0141803 A1 | 5/2014 | Marti | |
| 2014/0162628 A1 | 6/2014 | Bevelacqua | |
| 2014/0167794 A1 | 6/2014 | Nath | |
| 2014/0168170 A1 | 6/2014 | Lazarescu | |
| 2014/0171114 A1 | 6/2014 | Marti | |
| 2014/0180820 A1 | 6/2014 | Louboutin | |
| 2014/0185499 A1 | 7/2014 | Ray et al. | |
| 2014/0191979 A1 | 7/2014 | Tsudik | |
| 2014/0200053 A1 | 7/2014 | Balasubramanian | |
| 2014/0222335 A1 | 8/2014 | Piemonte | |
| 2014/0232633 A1 | 8/2014 | Shultz | |
| 2014/0232634 A1 | 8/2014 | Piemonte | |
| 2014/0247279 A1 | 9/2014 | Nicholas | |
| 2014/0247280 A1 | 9/2014 | Nicholas | |
| 2014/0269562 A1 | 9/2014 | Burchill | |
| 2014/0274150 A1 | 9/2014 | Marti | |
| 2014/0283135 A1 | 9/2014 | Shepherd | |
| 2014/0287818 A1* | 9/2014 | Chan et al. | 463/24 |
| 2014/0293959 A1 | 10/2014 | Singh | |
| 2014/0347491 A1* | 11/2014 | Connor | 348/158 |
| 2014/0364089 A1 | 12/2014 | Lienhart | |
| 2014/0364148 A1 | 12/2014 | Block | |
| 2014/0365120 A1 | 12/2014 | Vulcano | |
| 2015/0011242 A1 | 1/2015 | Nagaraj | |
| 2015/0026623 A1 | 1/2015 | Horne | |
| 2015/0031397 A1 | 1/2015 | Jouaux | |
| 2015/0358758 A1 | 12/2015 | Cronin | |

FOREIGN PATENT DOCUMENTS

| | | |
|---|---|---|
| WO | WO 2012/171025 | 12/2012 |
| WO | WO 2013/180850 | 12/2013 |
| WO | WO 2014/047205 | 3/2014 |
| WO | WO 2015/187508 | 12/2015 |
| WO | WO 2015/187594 | 12/2015 |

OTHER PUBLICATIONS

Apk Manager Plus—Android Apps on Google Play; Aug. 5, 2011 http://play.google.com/store/apps/details?id=com.magmamobile. apkmanager.plus.

ApkShare—Android Apps on Google Play; ApkShare NewPower Studios—Jan. 10, 2014.

AppShare(+)—Android Apps on Google Play, Oct. 11, 2013.

Cha, Bonnie; "Qaulcomm's Toq Smartwatch Needs More Time—Product Reviews", Dec. 26, 2013. http://allthingsd.com/20131226/qualcomms-toq-smartwatch-needs-more-time/.

Chen, Brian X.; "Tech Attire, More Beta Than Chic", The New York Times, Jan. 8, 2014. http://www.nytimes.com/2014/01/09/technology/tech-attire-more-beta-than-chic.html?hpw&rref=technology.

Chi, Jones; "My App Sharer", Google play, Feb. 8, 2014.

Integrating Pebble Watchapps with Phone Apps. © 2013 Pebble. Date of download: Jan. 10, 2014.

Jackson, William; "App would give 911 operators control of callers' smart phones—GCN", Jun. 12, 2013.

Migicovsky, Alex; "Outsmarting Proctors with Smartwatches: A Case Study on Wearable Computing Security", Proc. 18th Intl. Conference on Financial Cryptography and Data Secutiy, Mar. 2014. University of Michigan.

Narayanaswami, C.; "IEEE Xplore—Application design for a smart watch with a high resolution display", Oct. 16-17, 2000. IEEE Xplore Digital Library. Http://ieeexplore.ieee.org/xpl/login.jsp7tp=&arnumber=888452&url=ht...%2F%2Fieeexplore.ieee.org%2Fxpls%2Fabs_all.jsp%3Farnumber%3D888452.

Online file server, online storage, online backup, FTP server, file sharing with access control and version management—Egnyte Cloud

(56) References Cited

OTHER PUBLICATIONS

File Server. © 2014 EGNYTE, Inc. Date of download: Jan. 10, 2014. http://www.egnyte.com/file-server/online-file-server.html.
Pachal, Pete; "The Totally Wacky Way Motorola's New Droids Share Photos [Hands On]", Jul. 24, 2013.
Paluch, Dominik; "Toolkit for programmable watches", Ludwig-Maximillians-University, May 1, 2012 to Sep. 11, 2012.
Parrack, Dave; "Kreyos Meteor Smartwatch brings Star Trek tech to life", Gizmag, Jun. 25, 2013.
Pebble appstore to bring second life to smartwatch ecosystem—SlashGear, Dec. 18, 2013. © 2005-2014. http://www.slashgear.com/pebble-appstore-to-bring-second-life-to-smartwach-ecosystem-18309239/.
Pebble Managing App Resources © 2013 Pebble. Date of download: Jan. 10, 2014 Http://developer.getpebble.com/2/guides/managing-resources.html.
Pebble Technology That Makes Your Life Better—Date of download: Jul. 11, 2014 https://getpebble.com/discover.
Persistant Storage for Pebble OS © 2013 Pebble. Date of download: Jan. 10, 2014 Http://developer.getpebble.com/2/guides/persistant-storage.html.
"SendApp—Share your apps"—Android Apps on Google Play, Sep. 23, 2013.
Share Apps—Android Apps on Google Play; Nov. 2, 2013 http://play.google.com/store/apps/details?id=com.for2w.appshare.
"XcelMobility, Inc. Launches Cloud Connected Smartwatch", XcelMobility, Inc. Jan. 30, 2014.
I'M Watch—Start Living Smarter! Date of download: Jul. 16, 2014.
Docket No. OTO-0018 U.S. Appl. No. 14/309,117; Office Action mailed Sep. 18, 2014.
PCT Application No. PCT/US2015/033615 International Search Report and Written Opinion mailed Sep. 4, 2015.
U.S. Appl. No. 14/593,997, John Cronin, Sharing Mobile Applications Between Callers, filed Jan. 9, 2015.
PCT Application No. PCT/US2015/033404 International Search Report and Written Opinion mailed Oct. 23, 2015.
U.S. Appl. No. 14/593,997 Office Action mailed Feb. 29, 2016.

\* cited by examiner

OPTIMIZING MEMORY FOR A WEARABLE DEVICE

CROSS-REFERENCE TO RELATED APPLICATIONS

The present patent application claims the priority benefit of U.S. provisional patent application 62/007,927 filed Jun. 4, 2014 and titled "Sharing Mobile Applications Between Callers" and U.S. provisional patent application 62/007,858 filed Jun. 4, 2014 and titled "Optimizing Memory for a Wearable Device," the disclosures of which are incorporated herein by reference.

BACKGROUND

1. Field of the Invention

An embodiment of the invention relate to providing a sharing and app of a user's first mobile device with a second mobile device. More specifically, the present invention relates to optimizing memory for a wearable device.

2. Description of the Related Art

Mobile device software applications are a significant and growing portion of the smartphone industry. Mobile applications are designed to run on smartphones, tablet computers (including electronic reading devices or e-readers), and other mobile devices. apps may be made available by application developers through application distribution platforms, many of which are typically operated by the owner of the mobile operating system, such as the Apple® App Store$^{SM}$, Google Play™, Windows® Store, and BlackBerry® App World™. Some apps are available for free, while others must be bought. Usually, such apps are downloaded from the platform to a target device, such as an iPhone®, BlackBerry®, Android®, or Windows® phone, other mobile device, laptop, or desktop computer.

The more functions a mobile device has, the more useful it is to its user. Further, mobile device often used to multi-task (e.g., executing an apps during a telephone call). There is, however, currently no easy way for users to control a common application together (e.g., concurrently view the exact same instance of an application and its data at the same time). For example, a user may wish to perform certain application functions with another user, including editing an email/note, searching for directions, or reviewing financial data.

Some social gaming applications allow for multiple users to exchange data to view a game session with multiple users at the same time. Such game applications, however, are unable to be executed during a telephone call. In addition, such game applications may be associated with a dedicated game server that hosts the session, which some application developers are unable or do not have the resources to provide. Further, sharing capabilities across multiple users may be somewhat tangential to a primary purpose of an application (e.g., providing directions via a Maps application). As such, many popular applications lack the ability to be shared by multiple devices.

There are also a variety of different mobile devices with which applications may be shared. One category of such mobile devices may include wearable technology (e.g., smart watches, smart bracelets/cuffs). Such wearable technology may generally incorporate computing device functions into clothing or accessories that can be worn by the user. Some types of accessories may lack the full range of computing components or functions due to limitations relating to the ability to be worn (e.g., size, weight, structure, design). For example, a smart watch needs to be within a certain size and weight limitation to allow for wearing on a wrist of a user without obstructing normal movement. As such, a smart watch may not have the same memory capacity as other computing devices and may not be able to store or run the same types of applications.

As used herein, references to "smart watch" should be understood as being exemplary. The teachings herein may therefore pertain to any wearable device, including devices incorporated into or otherwise corresponding to clothing, jewelry, hatwear, and other items that can be worn by a user.

There is, therefore, a need in the art for improved systems and methods for optimizing memory for a wearable device.

SUMMARY OF THE CLAIMED INVENTION

Embodiments of the present invention provide systems and methods for optimizing memory for a wearable device. A selection may be received from a user via a user interface of a wearable device. Such user selection may indicate an application. Application data associated with the selected application may be identified as being located at another device. The application data may then be retrieved from the other device over a communication network. A display may be generated and displayed on the user interface of the wearable device. Such display may be based on the retrieved application data and associated with execution of the selected application.

Various embodiments may include methods for optimizing memory for a wearable device. Such methods may include receiving a selection from a user via a user interface of the wearable device that indicates an application, executing instructions stored in memory by a processor to identify that application data associated with the selected application is located at another device, retrieving the application data from the other device over a communication network, and generating a display for display on the user interface of the wearable device based on the retrieved application data. Such a generated display may be associated with execution of the selected application.

Further embodiments may include the wearable device for optimizing memory. Such a wearable device may include a user interface for receiving a selection from a user that indicates an application, a processor for executing instructions stored in memory to identify that application data associated with the selected application is located at another device, and a communication interface for retrieving the application data from the other device over a communication network. The user interface may then displays a display generated based on the retrieved application data. The generated display may be associated with execution of the selected application.

Still further embodiments of the present invention may further include non-transitory computer-readable storage media, having embodied thereon a program executable by a processor to perform methods or optimizing memory for a wearable device as described herein.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings.

DETAILED DESCRIPTION

Various embodiments of the present invention provide systems and methods for optimizing memory for a wearable device. A selection may be received from a user via a user interface of a wearable device. Such user selection may indicate an application. Application data associated with the selected application may be identified as being located at another device. The application data may then be retrieved from the other device over a communication network. A display may be generated and displayed on the user interface of the wearable device. Such display may be based on the retrieved application data and associated with execution of the selected application.

Figure 1:
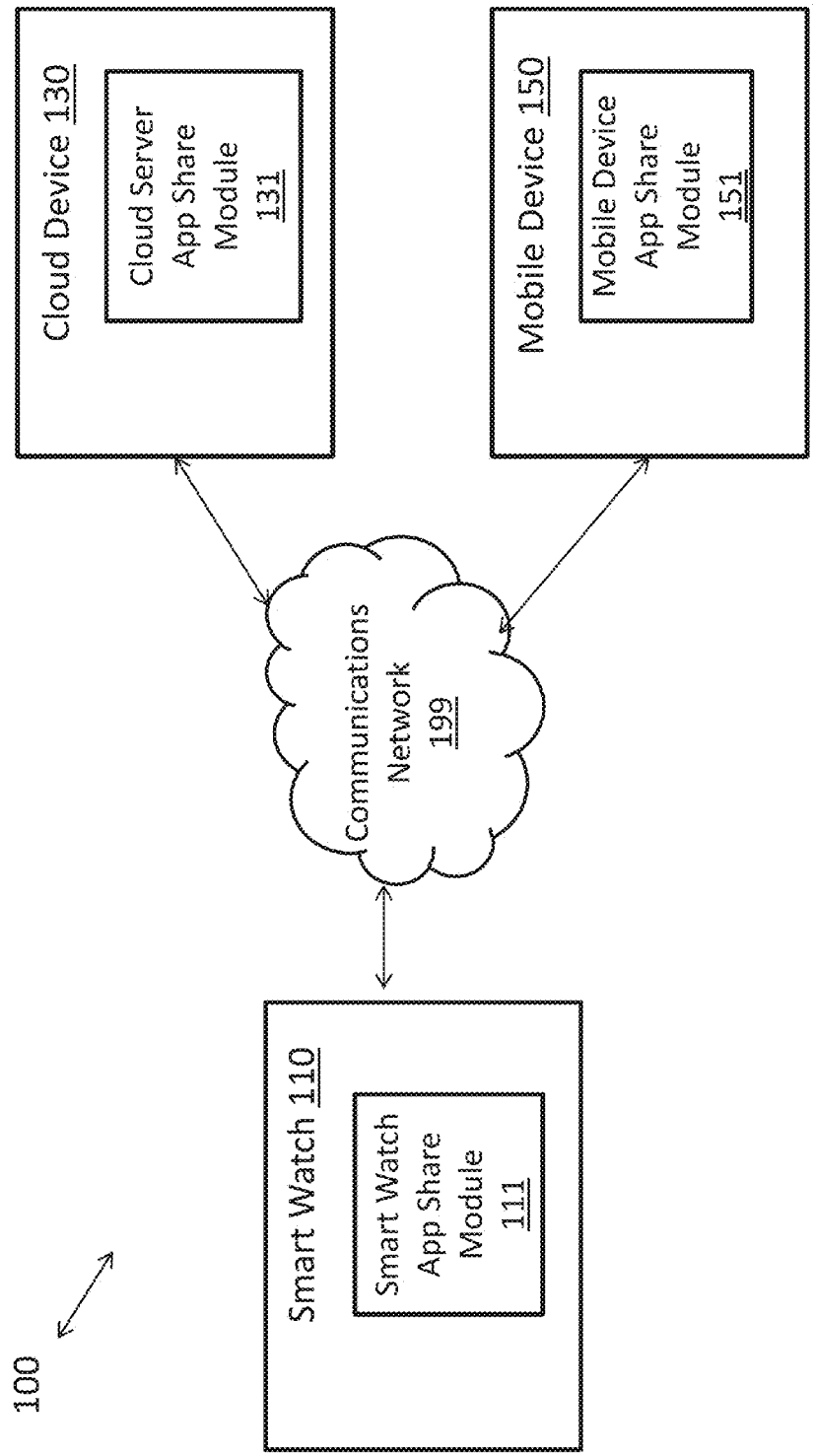
FIG. 1 illustrates an exemplary network environment in which a system for optimizing memory for a wearable device may be implemented.

FIG. 1 illustrates an exemplary network environment 100 in which a system for optimizing memory for a wearable device may be implemented. Network environment 100 may include smart watch 110 (which includes smart watch share module 111), a communications network 199, mobile device 150 (which includes mobile device app share module 151), and cloud device 130 (which includes cloud server app share module 131).

As noted previously, smart watch 110 may include any wearable device. Such a wearable device may correspond to and be worn like a watch. Alternatively, the wearable device may correspond to other types of clothing, jewelry, other decorative accessory, etc. Such smart watch 110 may have some components and functions in common with mobile device 150. In various instances, however, smart watch 110 may lack some components or ability to perform some functions (e.g., due to limitations related to wearability).

Users may use any number of different electronic user devices 150, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network 199. User devices 150 may also be configured to access data from other storage media, such as memory cards or disk drives as may be appropriate in the case of downloaded services. User device 150 may include standard hardware computing components such as network and media interfaces, non-transitory computer-readable storage (memory), and processors for executing instructions that may be stored in memory.

Cloud device 130 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Alternatively, different functionalities may be allocated among multiple servers, which may be located remotely from each other and communicate over the cloud. Any of the aforementioned servers (or an integrated server) may take on certain client-side, cache, or proxy server characteristics. These characteristics may depend on the particular network placement of the server or certain configurations of the server.

The smart watch 110 communicates with the mobile device 150 or cloud device 130 through a communications network 199 which may be an wireless local area network such as Bluetooth, UTMS, or WiFi (e.g., a IEEE 802.11 protocol), or high frequency systems (e.g., 900 MHz, 2.4 GHz, and 5.6 GHz communications systems), or infrared, other relatively localized wireless communication protocol, or any combination thereof. In that regard, communications network 199 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 199 allows for communication between any of the various components of network environment 100.

The smart watch app share module 111 (which is described in further detail with respect to FIG. 4) may work cooperatively with mobile device app share module 151 (which is described in further detail with respect to FIG. 5) and/or with cloud server app share module 131 (which is described in further detail with respect to FIG. 6) to manage memory between the devices. As such, the smart watch 110 may be able to access data and applications resident on mobile device 150 and cloud device 130 as needed. Such access allows smart watch 110 to perform functions that it may not ordinarily be capable of performing alone (e.g., due to limited memory or processing ability). For instance, the smart watch 110 may store only links to apps that are stored remotely at either the mobile device 150 or cloud device 130. In other embodiments, the smart watch 110 may store only portions of application software or application data. Thus, the ability to share applications (and application data) with mobile device 150 and cloud device 130 allows for efficient use of memory of the smart watch 110, as the smart watch app share module 111 can swap out app software and app data as needed.

Figure 2:
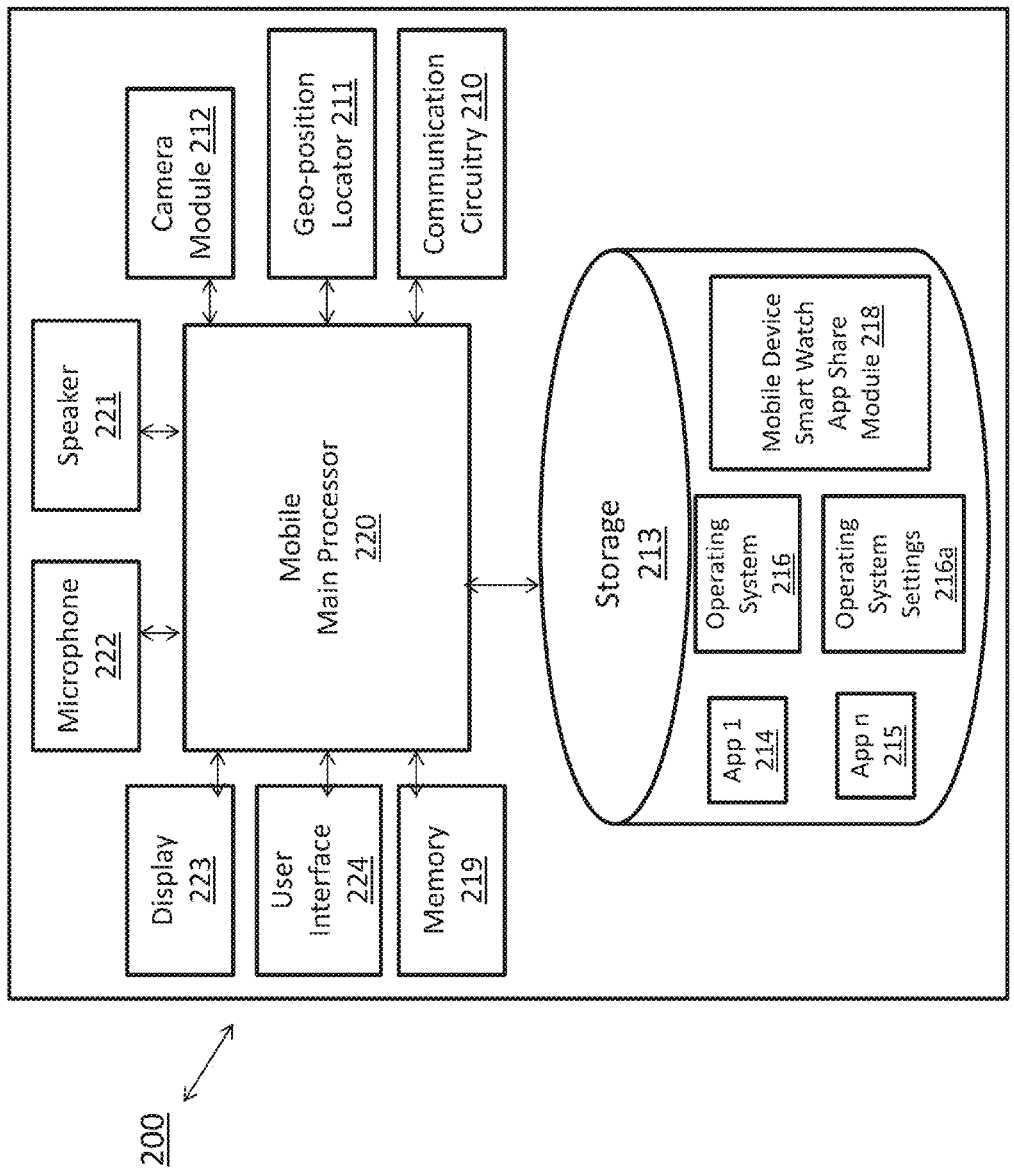
FIG. 2 is a diagram illustrating exemplary device architecture of an exemplary user device that may be used in a system for optimizing memory for a wearable device.

FIG. 2 is a diagram illustrating exemplary device architecture of an exemplary user device 200 that may be used in a system for optimizing memory for a wearable device. The user device (which may also be referred to herein as a mobile device or server device) may include any device that supports a two-way data exchange between itself and a wearable device.

User device 200 may have a housing (not shown) in which are integrated the components depicted in FIG. 2. User device 200 includes a main processor 220 that may interact with communications circuitry 210, a geo-position locator 211, camera circuitry 212, storage 213, memory 219, a speaker 220, a microphone 222, display 223, and user interface 224. The various components of user device 200 may be digitally interconnected and used or managed by a software stack being executed by the main processor 220. Many of the components shown or described here may be implemented as one or more dedicated hardware units and/or a programmed processor (software being executed by a processor (e.g., main processor 220).

The main processor 220 controls the overall operation of the user device 200 by performing some or all of the operations of one or more applications implemented on user device 200 by executing instructions (e.g., software code and data) that may be located in the storage 213. The main processor 220 may, for example, drive the display 223 and receive user inputs through the user interface 224 (which may be integrated with the display 223 as part of a touch screen on the front face of the user device 200). The main processor 220 may also perform the operations of providing the smart watch 110 of FIG. 1 with interactive information, such as information communicated through mobile device smart watch app share module 218, while the user device 200 is in wireless communication with smart watch 110 of FIG. 1.

Storage 213 may include any type of data storage known in the art, including nonvolatile solid state memory (e.g., flash storage) and/or a kinetic nonvolatile storage device (e.g., rotating magnetic disk drive). Storage 213 may include both local storage and storage space on a remote server. Storage 213 may store data, such as apps 214-215, calendar information 215, status updates 216, and software components that control and manage at a higher level the different functions of the user device 200. For instance, there may be a telephony application that configures a built-in touch-sensitive display (e.g., display 223) to look like the keypad of a traditional telephone handset and allows the user to enter a telephone number to be called or to select a previously stored number from a telephone address book. Such a telephony application may register the media device as a cellular handset with the nearest cellular base station (e.g., using the appropriate cellular communications protocols built into the user device 200). The telephony application may further allow calls to be initiated or answered, access the built-in microphone 222, and drive the earpiece speaker 221 to enable a two-way conversation during the call, as well as invoke mobile device smart watch app share module 218 based on some form of user input (e.g., selecting an application).

Applications stored in storage 213 may include any variety of apps 214-215 (e.g., calendars, productivity apps, games, etc.) native to the user device 200 or downloaded by a user. Some apps may be enabled for sharing with other user devices, including smart watch 110 of FIG. 1. As such, user device 200 may allow sharing of its apps and app data with another user device that is also enabled for sharing. Being enabled for sharing may entail having an app share module (e.g., app share module 218 described in further detail below with respect to FIG. 5) and/or other app data, which may include part or all of the app itself.

Storage 213 may also include an operating system 216 and operating system settings 216a, which may include standard operating system settings as well as operating system settings specific to the app share module 218. Storage 213 also includes the mobile device smart watch app share module 218 that controls app sharing functions, data, and controls.

In addition to storage 213, there may be memory 219 (e.g., main memory or program memory), which may provide access to stored code and data that is being executed by the main processor 220. Memory 219 may include solid state random access memory (RAM), (e.g., static RAM or dynamic RAM). There may be one or more processors (e.g., main processor 220) that run or execute various software programs, modules, or sets of instructions (e.g., applications) that may be stored in storage 213 and have been transferred to memory 219 for execution. It should be noted that these modules or instructions need not be implemented as separate programs, but rather may be combined or otherwise rearranged in various combinations. In addition, the enablement of certain functions could be distributed amongst two or more modules and may further be performed in combination with certain hardware.

The user device 200 may include communications circuitry 210. Communications circuitry 210 may include components that enable calls and data channel transfers over a wireless link (e.g., with a nearby base station). For example, communications circuitry 120 may include RF communications circuitry that is coupled to an antenna, so that the user of the user device 200 can place or receive a call through a wireless communications network. The RF communications circuitry may include a RF transceiver and a cellular baseband processor to enable the call through a cellular network. The communications circuitry 210 may also include Wi-Fi communications circuitry which may be used to establish a data channel with the smart watch 110 of FIG. 1. The Wi-Fi circuitry may also be used to conduct the call using a voice over Internet Protocol (VoIP) connection, through a wireless local area network instead of a cellular network connection.

The user device 200 may also include a geo-position locator 211. The geo-position locator 211 enables the user device 200 to determine its current geographic position. Such position may be obtained by a global positioning system (GPS). Using a GPS, the user device 200 can ascertain its present geographic location (e.g., latitude, longitude, altitude) by the detection and processing of signals from geo-synchronous satellites. The user device 200 may further use other alternative systems to determine its geographic location (e.g., line-of-sight, dead reckoning, wireless triangulation, or an equivalent location determination system). The geo-position locator 211 may be used to determine the current geographic location of the user device 200. The user of the user device 200 may configure the device to share such current location data with the party that the user places on hold.

The user device 200 may also include a digital camera module 212 that implements the digital camera functionality of the user device 200. The camera module 212 may be used to capture digital still images and/or videos that may be stored in the storage 213 and which may be shared with the smart watch 110 of FIG. 1.

In operation, main processor 220 controls the user device 200 of its normal functions that communicate with display 223, user interface 224, memory 219, microphone 222, speaker 221, camera module 212, geo-position locator 211, and communication circuitry 210. Smart watch 110 of FIG. 1 may communicate with user device 200 via communications network 199 of FIG. 1. User device 200 may further stores data and software in storage 213 (including apps 214-215), operating system 216, and the operating system settings 216a, telephony application 217, and mobile device smart watch app share module 218. User device 200 may be enabled for app sharing functions based on operating system settings 216a selected by the user.

When user device 200 is in communication with smart watch 110 of FIG. 1 through communications network 199 of FIG. 1, therefore, the mobile device smart watch app share module 218 may allow both devices (which may belong to the same or different users) to share applications that that are app share enabled, as long as the smart watch 110 has settings that enable its corresponding app share enable module. In some instances, smart watch 110 may already have some app data stored locally, but may need additional data from user device 200. As such, user device 200 may share app data that enables smart watch 110 to display data corresponding to execution of a selected app. The user may also execute mobile device smart watch app share module 218 to allow the user device to communicate with smart watch 110 via smart watch app share module 460 to manage the sensor data of the smart watch 110.

Figure 3:
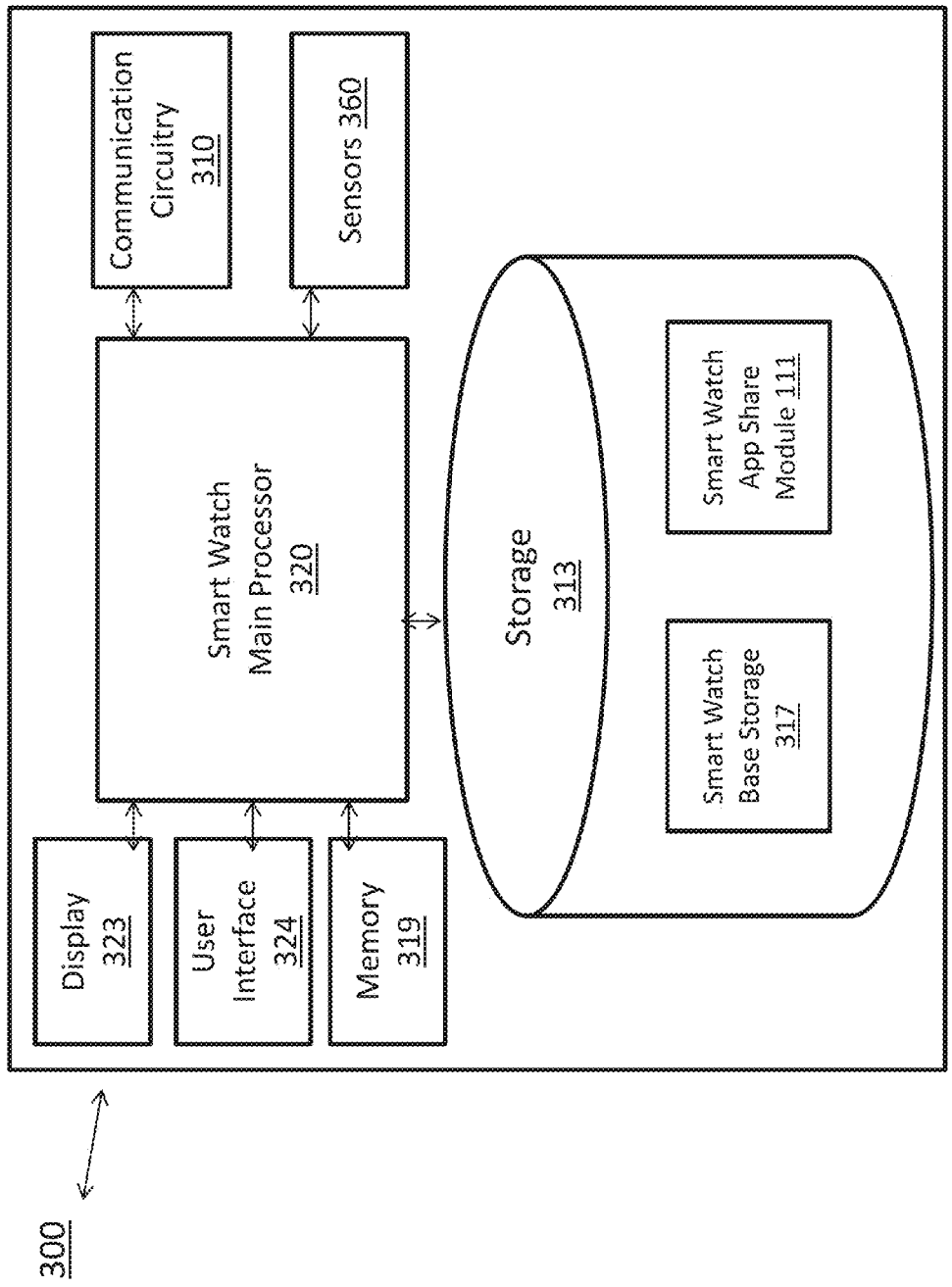
FIG. 3 is a diagram illustrating exemplary device architecture of an exemplary wearable device that may be used in a system for optimizing memory.

FIG. 3 is a diagram illustrating exemplary device architecture of an exemplary wearable device 300 that may be used in a system for optimizing memory. The wearable device may be referred to as a smart watch (e.g., smart watch 110 of FIG. 1), but may be any wearable device that supports a two-way data exchange between itself and a user device 200. In some instances, wearable device 300 may include health monitoring device or any haptic device.

The smart watch 300 may have a housing (not shown) in which are integrated the components depicted in FIG. 3. The smart watch 300 includes a main processor 320 that may interact with communications circuitry 310, storage 313, memory 319, display 323, and user interface 324. The various components of the smart watch 300 may be digitally interconnected and used or managed by a software stack being executed by the main processor 320. Many of the components shown or described here may be implemented as one or more dedicated hardware units and/or a programmed processor (software being executed by a processor (e.g., the main processor 320).

The main processor 320 controls the overall operation of the smart watch 300 by performing some or all of the operations of one or more applications implemented thereon by executing instructions (e.g., software code and data, applications) that may be located in the storage 313. The processor 320 may drive the display 323 and receive user inputs through the user interface 224 (which may be integrated with the display 223 as part of a touchscreen on the front face of the smart watch 300). The main processor 320 may also perform the operations of providing the smart watch 300 with interactive information, such as information communicated from mobile smart watch app share module 111 of user device 200, while the user of user device 200 is in wireless communication with smart watch 300.

Like the storage 213, storage 313 may provide data storage using nonvolatile solid state memory (e.g., flash storage) or any other types of memory known in the art. Storage 313 may include smart watch base storage 317 and smart watch app share module 111. In addition to storage 313, there may be memory 319 (e.g., main memory or program memory), which may provide access to stored code and data that is being executed by the main processor 320. Memory 319 may include solid state random access memory (RAM) (e.g., static RAM or dynamic RAM). There may be one or more processors (e.g., main processor 320) that run or execute various software programs, modules, or sets of instructions (e.g., applications) that may be stored in the storage 313, but have been transferred to the memory 319 for execution. It should be noted that these modules or instructions need not be implemented as separate programs, but rather may be combined or otherwise rearranged in various combinations. In addition, the enablement of certain functions could be distributed amongst two or more modules, and perhaps in combination with certain hardware.

The smart watch 300 may further include communications circuitry 310. Communications circuitry 310 may include components that enable data to be transfer over a wireless link to user device 200. For example, communications circuitry 320 may include RF communications circuitry that is coupled to an antenna, so that the user of the smart watch 300 can send or receive data through a wireless communications network (e.g., communication network 199). The communications circuitry 310 may also include Wi-Fi communications circuitry, which may be used to establish a data channel with the user device 200 and otherwise communicating data.

The smart watch 300 may further include sensors 360, such as accelerometers sensors, temperature sensor, light sensors, medical sensors, haptic sensors (e.g., touch, pressure, etc.), and other sensors known in the art. data from sensors 360 may be extracted and stored in memory 319 by processor 320 and sent as directed by smart watch app share module 318 to communications circuitry 310. Such transmission of sensor data may occur in real-time as the sensor data is received, periodically, upon connection to a communication network (e.g., communication network 199 of FIG. 1), upon request by a user, or automatically based on various factors (e.g., amount of sensor data in storage 313 meeting a threshold level, need for additional storage).

Figure 4:
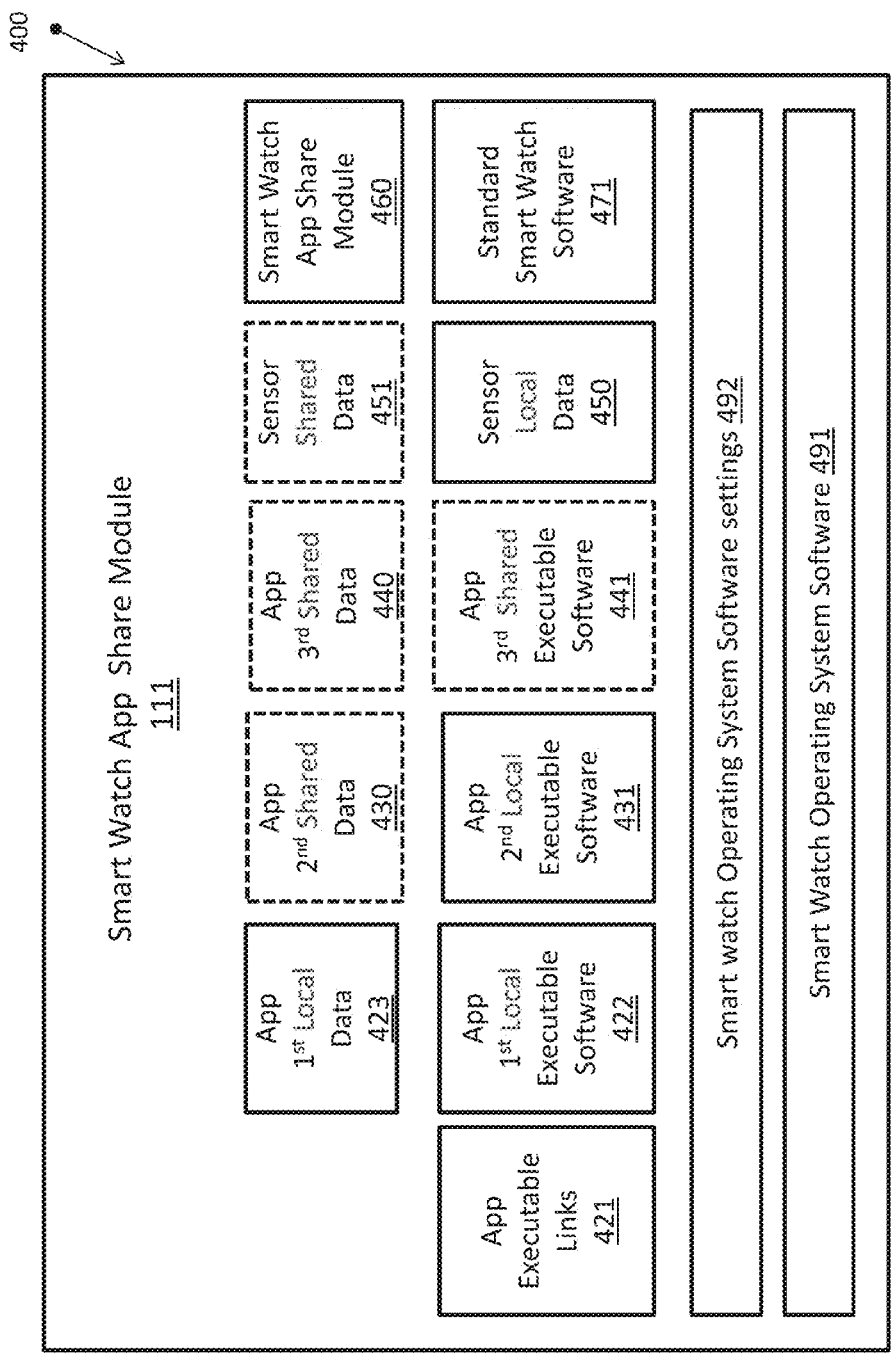
FIG. 4 is a block diagram of a wearable device module of a wearable device that may be used in a system for optimizing memory.

The smart watch 300 may include smart watch app share module 111 of FIG. 1 which is described in further detail in FIG. 4. Smart watch app share module 111 may include various programs that manage apps, associated app data, and allocations of memory for the same.

In operation, main processor 320 may controls normal functions the smart watch 300, which may include communicating with display 323, user interface 324, memory 319, and communication circuitry 310. Smart watch 300 may communicate with user device 200 of FIG. 2 through communications network 199 of FIG. 1. Smart watch 300 may store data and software in storage 313 for smart watch base storage 317 and smart watch app share module 318. When user device 200 is in communication with smart watch 300 through communications network 199, the smart watch 300 can share any part or all of applications and associated data using smart watch app share module 111. Thus, the smart watch 300 can run smart watch applications and data efficiently, since smart watch applications and data and portions thereof can be stored remotely at the connected user device 200 (which may be mobile device 150 or cloud device 130).

FIG. 4 is a block diagram of a wearable device module (e.g., smart watch app share module) 111 of a wearable device that may be used in a system for optimizing memory. Such a wearable device share module 111 may include smart watch operating system software 491, smart watch operating system software settings 492, app executable links 421, app 1st local executable software 422, app 1st local data 423, app 2nd local executable software 431, app 2nd shared data 430, app 3rd shared executable software 441, app 3rd shared data 440, sensor local data 450, sensor shared data 451, standard smartwatch software 471, and smart watch app share module 460.

In operation, smart watch app module 111 allows the user to set up the smart watch operating system software 491 based on selections to the smart watch operating system software settings 492. Once set up, the smart watch 110 may be able to communicate and share data with other devices (e.g., user device 200). In this regard, the other devices may have corresponding app share modules (e.g., mobile device smart watch app share module 218) that are enabled to allow the user device to communicate and share data with smart watch 110 (via smart watch app share module 111).

The smart watch app share module 460 may be set up to allow for sharing with respect to various types of applications, including app executable links 421, app 1st local executable software 422, app 1st local data 423, app 2nd local executable software 431, app 2nd shared data 430, app 3rd shared executable software 441, app 3rd shared data 440, sensor local data 450, and sensor shared data 451. As such, the smart watch 110 may efficiently manage software applications and associated data. Such apps may have software and associated data are either stored as executable links, in full (all software and data), or in part (any portion of software and data).

Smart watch operating system software 491 may be, for example, an operating Pebble OS based upon FREERTOS. The smart watch operating system software 491 runs all the functions of the smart watch 110 (e.g., clocks, input/output buttons, user interface and all executable software and its related data).

Smart watch operating system software settings 492 may include standard settings (e.g., alarms, connections, watch face displays, etc.), as well as settings specific to app share module 460. Additional settings may include Bluetooth (e.g., to make smart watch discoverable from your smartphone), date, time, display (e.g., to enable/disable backlight, notifications, and character size, scale, style), hardware and software version information, shut down, factory reset, watch faces, music apps, and phone call notifications (e.g., vibration when an incoming phone call is received, caller ID). If the caller is in your address book, the smart watch may further display the name of the caller), message notifications, and alarms.

App executable links 421 may include a list of all smart watch apps that are available, including those stored offline (e.g., mobile device 150 or cloud device 130). Some applications may therefore be stored on the smart watch as executable links. The app share module 460 allows the user of the smart watch 110 to select from a list of apps. When an app is selected, the app software and data may be loaded into the smart watch processor 320 via the stored link (e.g., to the stored app on user device 200). Thus, the app itself is not required to be stored on the smart watch 110 in order to provide the user with the same application experience. In some instances, the downloaded app software and data may be deleted once the user has exited out of that selected app to maximize available memory of the smart watch 110.

App 1st local executable software 422 and the corresponding data of app 1st local data 423 may refer to any app software and associated data that can run on a smart watch 110. For some apps, all the necessary software and data may be stored on the smart watch itself. The app share module 460 may allow the user to see a list of all apps that are stored, as well as its associated links, components, or related data, or otherwise available to smart watch 110.

App 2nd local executable software 431 may be an app that has small execution code, but a lot of data (e.g., news feeds, social network feeds). In this regard, the list of apps generated by app share module 460 may indicate which apps may be stored partially (e.g., only the executable file is stored, but part or all associated data may be stored remotely). When a user selects app 2nd local executable software 431 and its associated app 2nd shared data 430, the remote data may be retrieved (e.g., downloaded) from the user device 200 through communications network 199 and used to execute the app 2nd local executable software 431. When the user is detected as having exited the app, the retrieved data may be deleted from the smart watch 110. Thus, functionally is maintained while maximizing smart watch memory space.

App 3rd shared executable software 441 and its associated data (app 3rd shared data 440) may be apps that have large execution code and/or large associated data. Such apps may include games and medical- or health-related apps. In this regard, the list of apps generated by app share module 460 may indicate which apps may have high storage requirements in both executable code and data (e.g., app 3rd shared executable software 441 and its associated app 3rd shared data 440). When such an app is selected, its software and associated data may be retrieved from the user device 200 through communications network 199. When user has exited the app, part or all of the app itself and/or its associated data may be deleted from the smart watch 110 to maximize available memory space. Unlike app executable links 421 whose links are stored on smart watch 110, the app share module 460 may extract a list of apps that are available from the user device 200 prior to loading. Thus, space is saved on the smart watch 110 while functionality is maintained.

Sensor local data 450 and its related sensor shared data 451 may include any type of sensor data known in the art, including accelerometer data, temperature data, etc. Such sensor data can be useful to certain apps (e.g., health-related apps that monitor pulse, temperature, etc.). App share module 460 can allow such sensor data to be stored locally on the smart watch 110 (as sensor local data 450) or sent to user device 200 for storage (e.g., sensor shared data 451). In some instances, the user can select time intervals at which the smart watch 110 can send sensor data to user device 200. Alternatively, such transmissions of sensor data may be triggered (e.g., detection of connection to user device 200 via communications network 199).

Standard smart-watch software 471 may include standard software running on the smart watch 100 and associated settings (e.g., Bluetooth, date, time, alarms, display, backlight, notifications, shut down, factory reset, watch faces, music apps, phone call notifications from associated phones, including caller ID, etc.).

Figure 5:
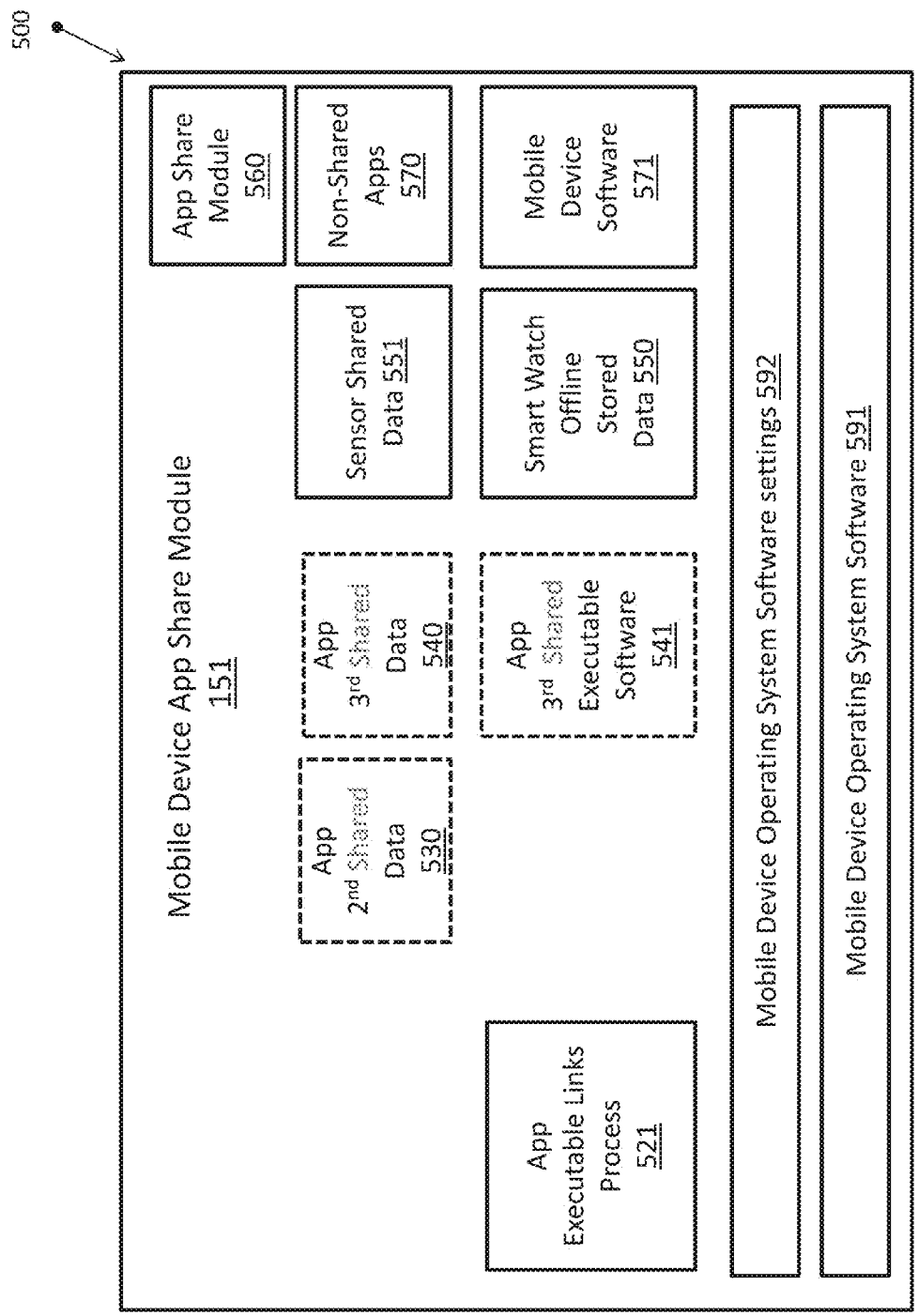
FIG. 5 is a block diagram of a user device module of a user device that may be used in a system for optimizing memory for a wearable device.

FIG. 5 is a block diagram of a user device module 151 of a user device that may be used in a system for optimizing memory for a wearable device. Such a user device app share module 151 may include mobile device operating system software 591, mobile device operating system software settings 592, app executable links process 521, app 2nd shared data 530, app 3rd shared executable software 541, app 3rd shared data 540, mobile device offline stored data 550, sensor shared data 551, all non-shared apps 570, standard mobile device software 571, smart watch offline stored data 550, and mobile device app share module 560.

Mobile device operating system software 591 may include any user device operating system known in the art (e.g., iOS or Android OS). The mobile device operating system software 591 runs the functions of the mobile device (e.g., clocks, input/output buttons, user interface, and all executable software and its related data).

Mobile device operating system software settings 592 may include standard settings to the mobile device operating system (e.g., alarms, Bluetooth connections, etc.), as well as settings specific to mobile device app share module 560. Such setting are discussed in further detail with respect to FIG. 7.

App executable links 521 may be a list of any and all mobile device apps that are available. These applications may be stored on the mobile device as fully executable apps software and their associated data. The app executable links 521 may ensure that all smart watch apps on smart watch 110 may be identified as executable links in app executable links 421 are available on the mobile device. If not, the user may be notified. The app share module 560 allows the user on the mobile device to see a list of apps names. When an app is selected, the app software and data may be loaded into the mobile device using the link to that app on the mobile device.

App 2nd shared data 530 may include data for those apps for which the smart watch 110 may have the executable software stored locally, but lacks the associated data. Such data is stored on the mobile device as app 2nd shared data 530 and made accessible over the communication network 199.

App 3rd shared executable software 541 and its associated app 3rd shared data 540 may include those apps and associated data that are not stored locally on smart watch 110. Any component of the executable software and/or its associated data may therefore be stored as app 3rd shared executable software 531 or app 3rd shared data 540 on the user device and made available to the smart watch 110 when app share module 560 is activated.

Sensor shared data 551 may store the sensor data sent from smart watch 110. Standard mobile device software 571 may include any standard software operable on the mobile device. All non-shared apps 570 may include those apps on the mobile device that are not enabled for sharing or operation on smart watch 110.

Smart watch offline stored data 550 may include any other data that the smart watch 110 may store remotely that are not apps (e.g., copy or backup of smart watch operating system software settings 492).

Mobile device app share module 560 allows mobile device app module 111 to manage mobile device operating system software 591, mobile device operating system software settings 592, app executable oinks 521, app 2nd shared data 530, app 3rd shared executable software 541, app 3rd shared data 540, sensor shared data 551, all non-shared apps 570, smart watch offline stored data 550, and standard mobile device software 571.

In operation, mobile device app share module 151 allows the user to set up the mobile device operating system software 591 through the mobile device operating system software settings 592. The user may further execute mobile device app share module 560 to manage app executable links 521, app 2nd shared data 530, app 3rd shared executable software 541, app 3rd shared data 540, mobile device offline stored data 550, sensor shared data 551, all non-shared apps 570, standard mobile device software 571, and smart watch offline stored data 550.

The mobile device app share module 151 may further allow interaction between the user device 200 and the smart watch 110, so that memory of the smart watch 110 is efficiently used. The user device 200 may be used to store sensor data, apps and portions thereof, app data, and backup data for smart watch 100. Mobile device app share module 151 may further allow the user to select these options, as well as corresponding options on the smart watch 110. As such, the smart watch 110 and the user device 200 may work cooperatively when connected via communications network 199.

Figure 6:
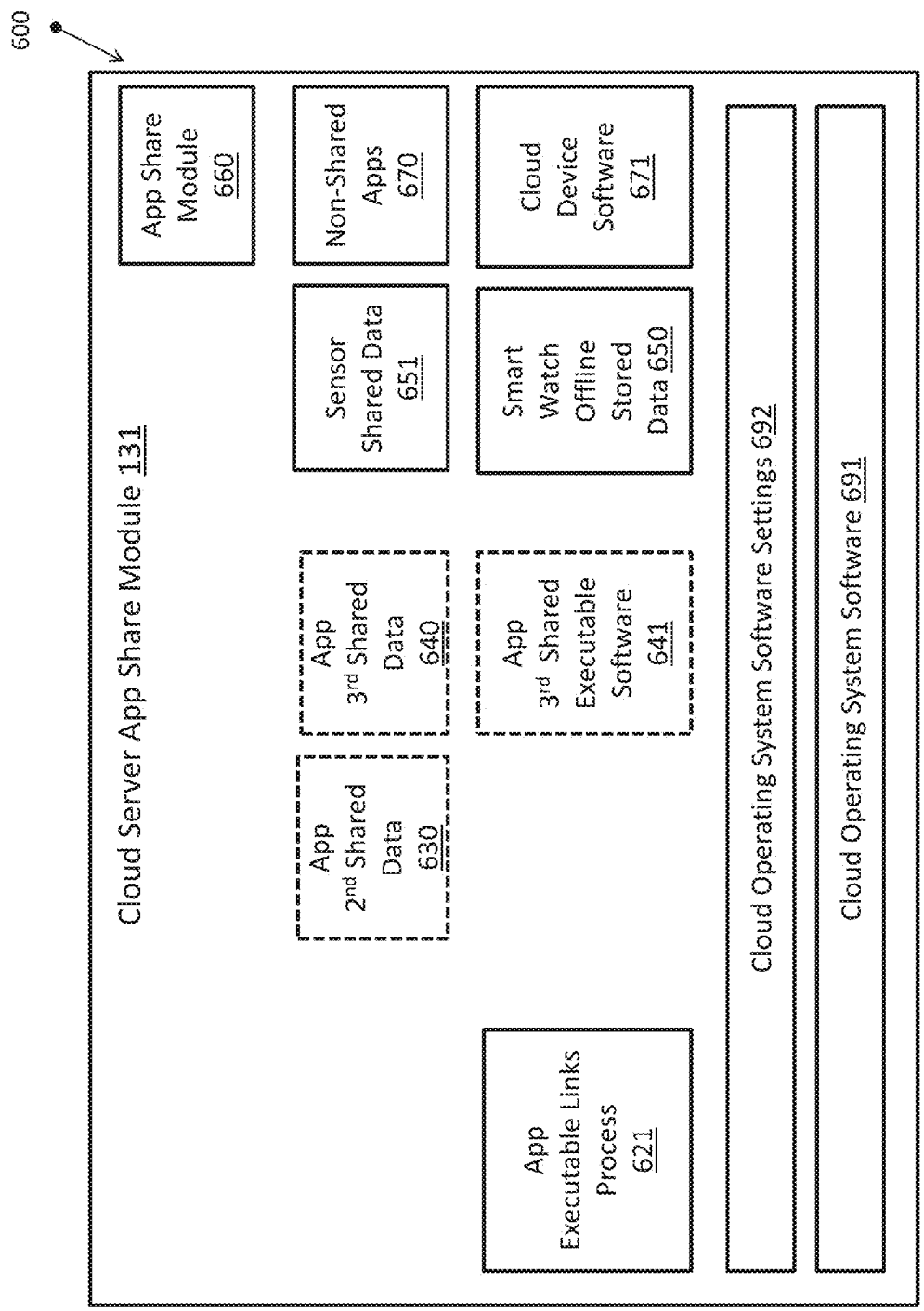
FIG. 6 is a block diagram of a cloud server module of a cloud server that may be used in a system for optimizing memory for a wearable device.

FIG. 6 is a block diagram of a cloud server module 131 of a cloud server that may be used in a system for optimizing memory for a wearable device. Such a cloud server app share module 131 may include cloud device operating system software 691, cloud device operating system software settings 692, app executable links 621, app 2nd shared data 630, app 3rd shared executable software 641, app 3rd shared data 640, cloud device offline stored data 650, sensor shared data 651, all non-shared apps 670, standard cloud device software 671, smart watch offline stored data 650, and cloud device app share module 660.

Cloud device operating system software 691 may be any server operating system known in the art for running the functions of the cloud device. Cloud device operating system software settings 692 may include standard settings for cloud device, as well as settings specific to cloud device app share module 660.

App executable links 621 may be used to provide a list of all apps available via the cloud device. These applications may be stored on the cloud device as fully executable apps software and their associated data. The app executable oinks 621 may ensure that all smart watch apps on smart watch 110 are identified as executable links in app executable links 421 are available on the cloud device. If not, the user may be notified. The app share module 660 may further allow the cloud device to provide a list of apps names. When one of those apps is selected, the app software and data may be loaded into the cloud device using the link to that app on the cloud device.

App 2nd shared data 630 may be any app for which the smart watch 110 may have locally stored the executable software, yet lack the associated data. Such associated data may be stored on the cloud device and made available for the smart watch 110 to download as needed.

App 3rd shared executable software 641 and its associated app 3rd shared data 640 may be app for which the smart watch 110 lacks both the executable software and its associated data. Such apps and associated data may be made available to the smart watch 110 when app share module 660 is activated.

Sensor shared data 651 may store the sensor data sent from smart watch 110. Standard cloud device software 671 may be any standard software operable on the cloud device. All non-shared apps 670 are the apps on the cloud device that are not enabled for sharing or operation on smart watch 110. Smart watch offline stored data 650 may be any other data from smart watch 100 that are not apps (e.g., copy or backup of smart watch operating system software settings 492).

Cloud device app share module 660 may allow cloud device app module 111 to manage cloud device operating system software 691, cloud device operating system software settings 692, app executable links 621, app 2nd shared data 630, app 3rd shared Executable software 641, app 3rd shared data 640, sensor shared data 651, all non-shared apps 670, smart watch offline stored data 650, and standard cloud device software 671.

In operation, cloud device app share module 131 allows the user to set up the cloud device operating system software 691 through the cloud device operating system software settings 692. This allows the user of cloud device to operate standard cloud device software 671. Once set up, the user also sets up the operating system settings cloud device operating system software settings 692. The user may further execute cloud device app share module 660 to manage app executable links 621, app 2nd shared data 630, app 3rd shared executable software 641, app 3rd shared data 640, cloud device offline stored data 650, sensor shared data 651, all non-shared apps 670, standard cloud device software 671, smart watch offline stored data 650, and cloud device app share module 660. The cloud device app share module 131 allows interaction between the cloud device and the smart watch 110 so that memory of the smart watch 110 may be efficiently used. As such, cloud device may store sensor data, apps or portions thereof, associated app data, and/or backup data for the smart watch 110. Cloud device app share module 131 may further allow the user to set and select these options, as well as corresponding options on the smart watch 110 for sharing. As such, smart watch 110 and the cloud device may work cooperatively when linked via the communications network 199.

Figure 7:
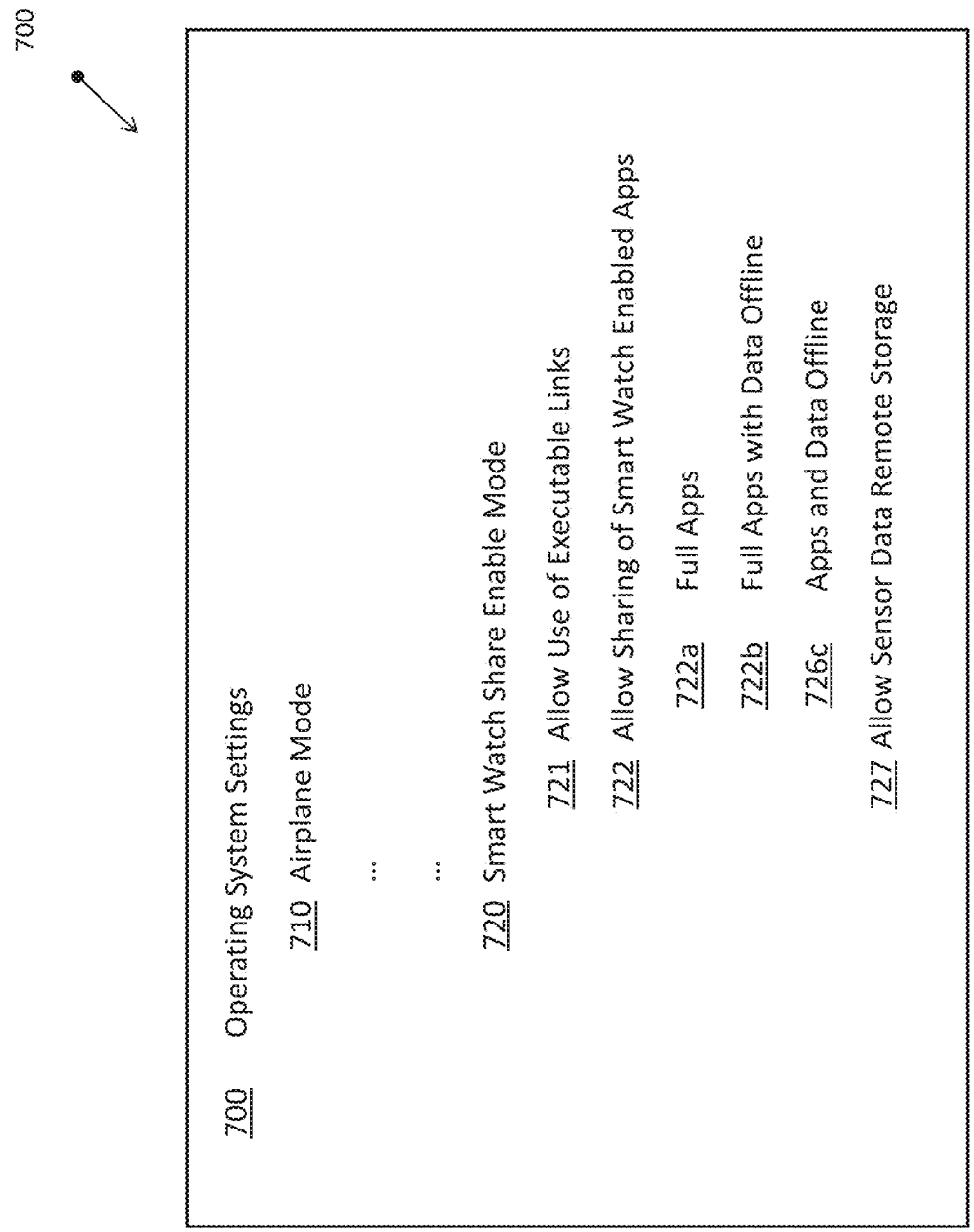
FIG. 7 is a diagram illustrating exemplary settings of an operating system on a user device that may be used with a system for optimizing memory for a wearable device.

FIG. 7 is a diagram illustrating exemplary settings 700 of an operating system on a user device that may be used with a system for optimizing memory for a wearable device. Such settings 700 may include airplane mode 710, smart watch share enable mode 720, allow use of executable links 721, allow sharing of smart watch enabled apps 722, full apps 722a, full apps with data offline 722b, apps and data offline 726c, and allow sensor data offline storage 727.

Airplane mode 710 is an example of a typical mobile device operating system settings. Smart watch share enable mode 720 may include settings to enable the smart watch to communicate with the mobile or cloud device to share data. Allow use of executable links 721 may include settings for enabling enable executable links on a smart watch to be executed, thereby allowing the automatic loading of the app and its software and data from the mobile or cloud device to the smart watch 110.

Allow sharing of smart watch enabled apps 722 of FIG. 6 of operating system settings 700 may be a setting that allows smart watch enabled apps to be available for upload from the user device to the smart watch 110. Full apps 722a of operating system settings 700 may include settings that allow all full apps software and data to be available for upload from the mobile or cloud device to the smart watch 110.

Full apps with data offline 722b may include settings that allow for remote data of an app on a smart watch to be stored on the mobile or cloud device and for that data to be available for upload from the mobile or cloud device to the smart watch 110.

Apps and data offline 726c may include settings for remotely storing the executable code and associated data to be stored on the mobile or cloud device and for that data to be available for upload from the mobile or cloud device to the smart watch 110.

Allow sensor data offline storage 727 may include settings for allowing the data generated by a smart watch to be downloaded to the mobile device or cloud device.

Figure 8:
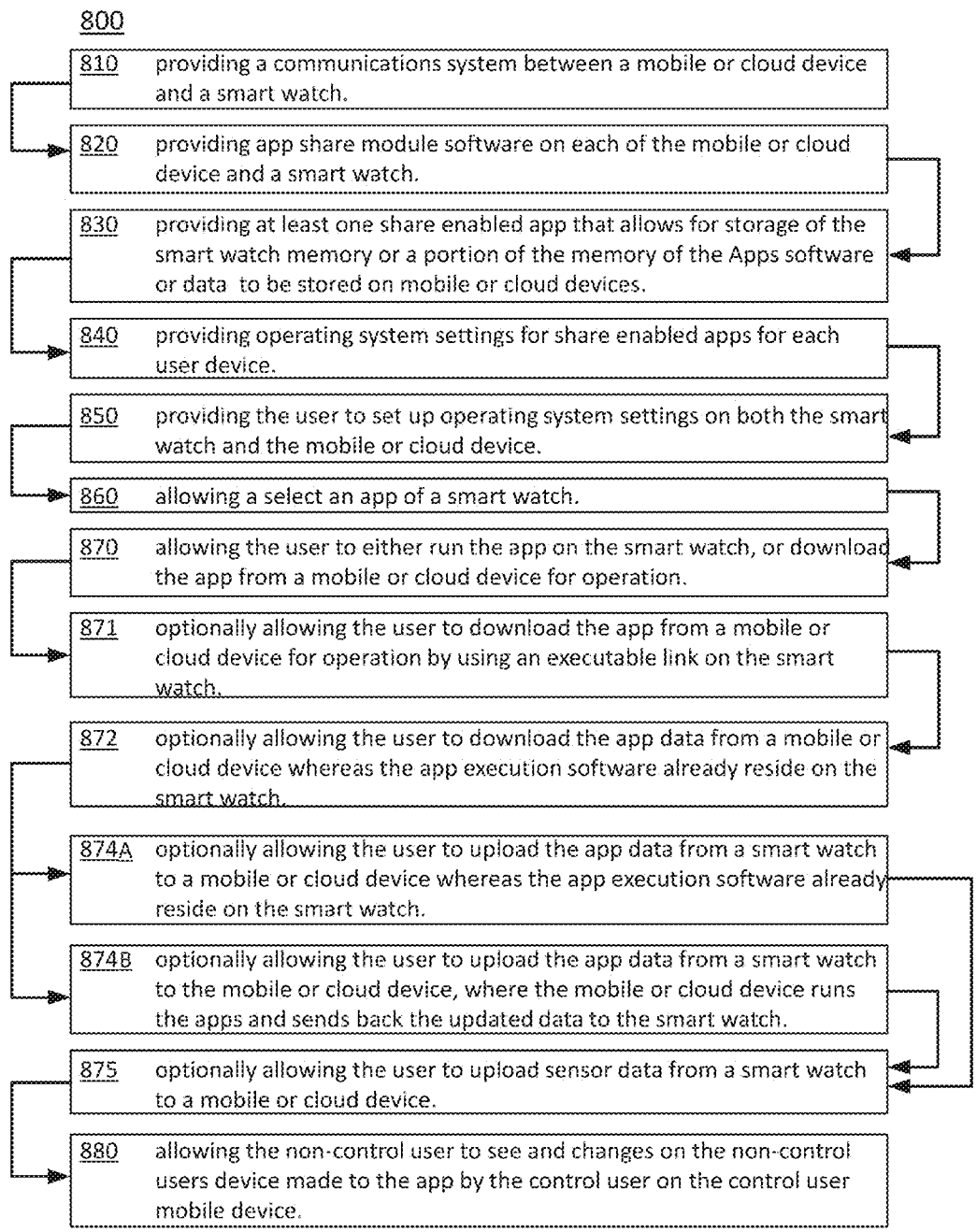
FIG. 8 is a flowchart illustrating an method for optimizing memory for a wearable device.

FIG. 8 is a flowchart illustrating an method for optimizing memory for a wearable device. In a such a method, a selection may be received from a user via a user interface of the wearable device that indicates an application. Such method may further include executing instructions stored in memory by a processor to identify that application data associated with the selected application is located at another device, retrieving the application data from the other device over a communication network, and generating a display for display on the user interface of the wearable device based on the retrieved application data. Such a generated display may be associated with execution of the selected application.

In step 800, a smart watch center system 100 may be provided. The smart watch center system 100 contains hardware and software to run a mobile or cloud device and a smart watch device using common share enabled apps to share data. The sharing may be invoked through enabling operating systems settings on both the smart watch and mobile device or cloud device via corresponding app share modules. The apps sharing system may further allow for communications between mobile device and a wearable device.

In step 810, a communications system may be provided between a mobile or cloud device and a smart watch. In step 820, an app share module software on each of the mobile or cloud device and a smart watch may be enabled. In step 830, at least one share-enabled app may allow for distributed storage across the smart watch memory and mobile or cloud devices.

In step 840, operating system settings for share-enabled apps for each user device may be activated or selected. In step 850, the user may set up operating system settings on both the smart watch and the mobile or cloud device. In step 860, a user may select an app of a smart watch. In step 870, the user may either initiate execution of the app on the smart watch or download the app from a mobile or cloud device for execution. In step 871, the user may download the app from a mobile or cloud device for operation by using an executable link on the smart watch.

In step 872, the user may optionally initiate download of app data from a mobile or cloud device where the app execution software may already reside on the smart watch. Depending on where the app may be, the user may upload the app data from a smart watch in step 874A, and the resident app on the smart watch may execute using the uploaded app data. Alternatively, the user may upload the app data from a smart watch to the mobile or cloud device in step 874B, such that the mobile or cloud device runs the apps and sends back the updated data to the smart watch.

In step 875, the user may upload sensor data from a smart watch to a mobile or cloud device. In step 880, the wearable device (which may be associated with the same or different user) may be provided with a display of changes made by the control user on the control user mobile device.

Figure 9:
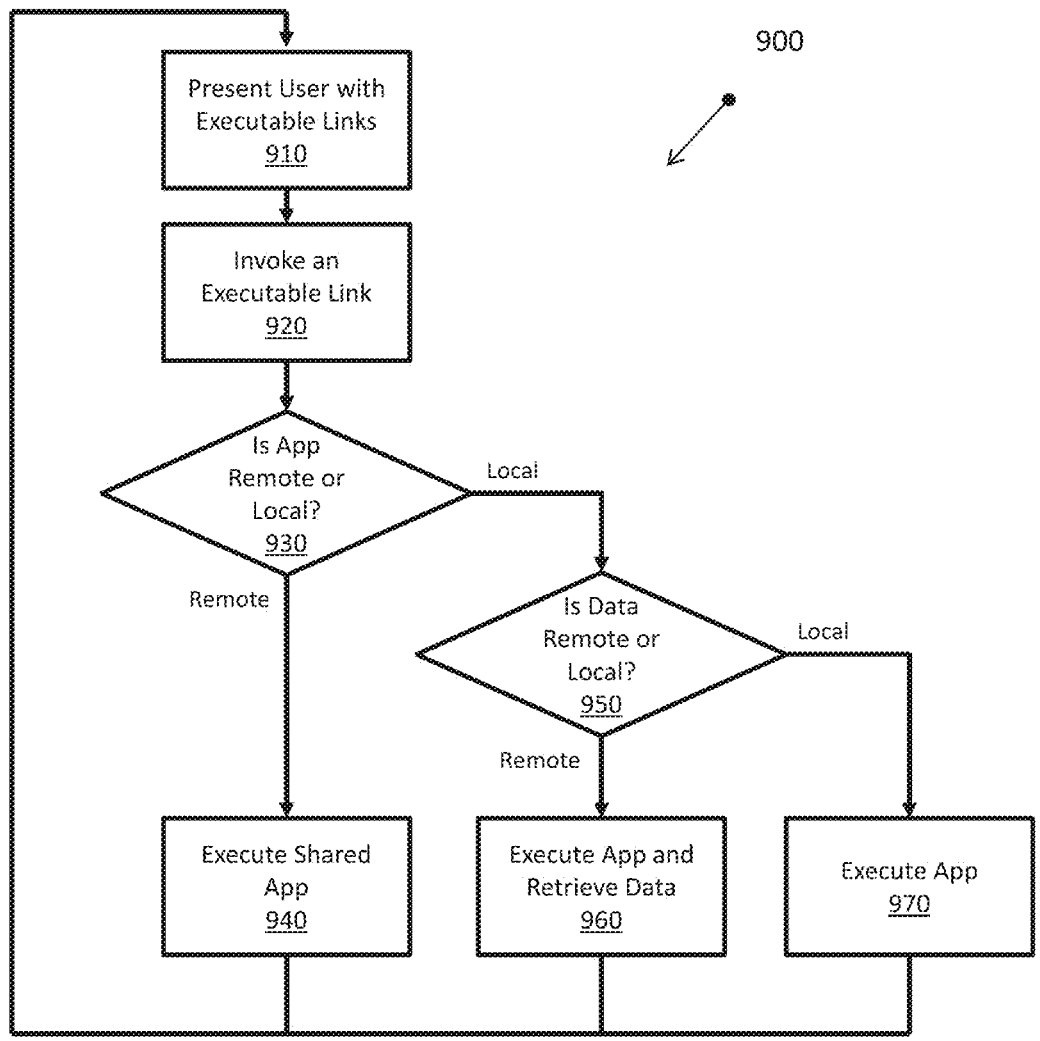
FIG. 9 is a flowchart illustrating an alternate method for optimizing memory for a wearable device.

FIG. 9 is a flowchart illustrating an alternate method for optimizing memory for a wearable device. A user may be provided with executable links, an executable link may be invoked, and it may be determined whether an app is remote or local. If the app is determined to be local and its data is also local, the application may be executed. Alternatively, if the app or its associated data is remote, the app and/or its associated data may need to be retrieved before it can be executed.

In step 910, the user of a wearable device may be presented with a menu comprising various available applications. Such applications may or may not be stored locally at the wearable device. Where the wearable device may have access to apps stored in whole or in part at other devices, the wearable device may retrieve data regarding all available devices and present a list to a user of the wearable device.

In step 920, an executable link may be invoked via selection from the user of the wearable device. The executable link may be associated with an app resident on the wearable device or on a remote device (e.g., mobile device or cloud server).

In step 930, it may be determined whether the selected app is stored locally or remotely (e.g., at the user device, specifically a mobile device or cloud server). Where the selected app is determined to be remotely stored, the selected app (and associated data) may be retrieved (e.g., downloaded) and executed in step 940.

Where the selected app is determined to be locally stored, but some associated data is determined to be remotely stored in step 950, the app data may be retrieved. In addition, the app may be executed using the retrieved app data in step 960. Where the selected app and its associated data are determined to be locally stored in step 970, the app may be executed in relation to the associated data.

Figure 10:
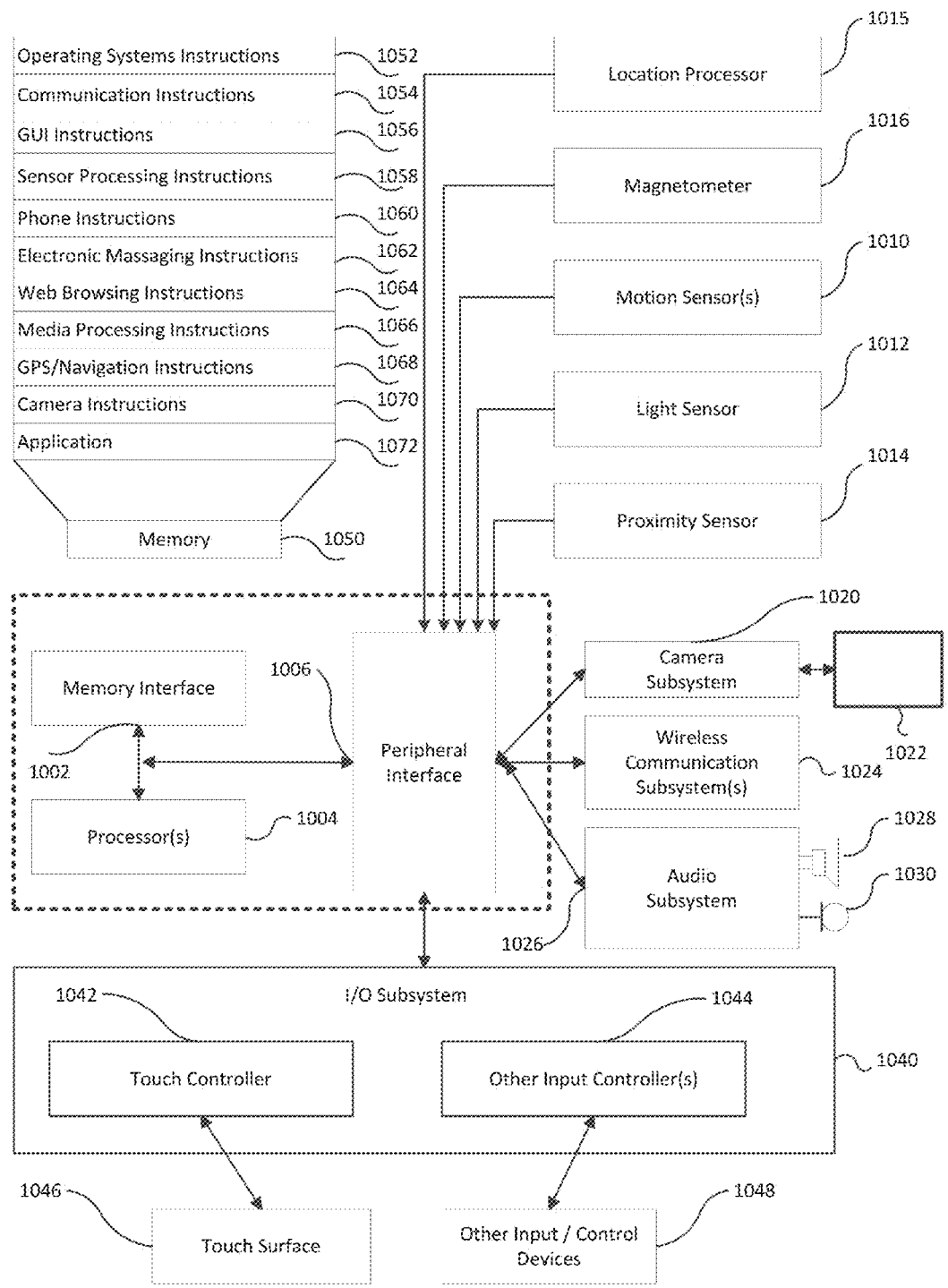
FIG. 10 illustrates a mobile device architecture that may be utilized to implement the various features and processes described herein.

FIG. 10 illustrates a mobile device architecture 1000 that may be utilized to implement the various features and processes described herein. Architecture 1000 can be implemented in any number of portable devices including but not limited to smart phones, electronic tablets, and gaming devices. Architecture 1000 as illustrated in FIG. 10 includes memory interface 1002, processors 1004, and peripheral interface 1006. Memory interface 1002, processors 1004 and peripherals interface 1006 can be separate components or can be integrated as a part of one or more integrated circuits. The various components can be coupled by one or more communication buses or signal lines.

Processors 1004 as illustrated in FIG. 10 is meant to be inclusive of data processors, image processors, central processing unit, or any variety of multi-core processing devices. Any variety of sensors, external devices, and external subsystems can be coupled to peripherals interface 1006 to facilitate any number of functionalities within the architecture 1000 of the exemplar mobile device. For example, motion sensor 1010, light sensor 1012, and proximity sensor 1014 can be coupled to peripherals interface 1006 to facilitate orientation, lighting, and proximity functions of the mobile device. For example, light sensor 1012 could be utilized to facilitate adjusting the brightness of touch surface 1046. Motion sensor 1010, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 1006, such as a temperature sensor, a biometric sensor, or other sensing device to facilitate corresponding functionalities. Location processor 1015 (e.g., a global positioning transceiver) can be coupled to peripherals interface 1006 to allow for generation of geo-location data thereby facilitating geo-positioning. An electronic magnetometer 1016 such as an integrated circuit chip could in turn be connected to peripherals interface 1006 to provide data related to the direction of true magnetic North whereby the mobile device could enjoy compass or directional functionality. Camera subsystem 1020 and an optical sensor 1022 such as a charged coupled device (CCD) or a complementary metal-oxide semiconductor (CMOS) optical sensor can facilitate camera functions such as recording photographs and video clips.

Communication functionality can be facilitated through one or more communication subsystems 1024, which may include one or more wireless communication subsystems. Wireless communication subsystems 1024 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 1024 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 1024 may include hosting protocols such that the device may be configured as a base station for other wireless devices. Communication subsystems can also allow the device to synchronize with a host device using one or more protocols such as TCP/IP, HTTP, or UDP.

Audio subsystem 1026 can be coupled to a speaker 1028 and one or more microphones 1030 to facilitate voice-enabled functions. These functions might include voice recognition, voice replication, or digital recording. Audio subsystem 1026 in conjunction may also encompass traditional telephony functions.

I/O subsystem 1040 may include touch controller 1042 and/or other input controller(s) 1044. Touch controller 1042 can be coupled to a touch surface 1046. Touch surface 1046 and touch controller 1042 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 1046 may likewise be utilized. In one implementation, touch surface 1046 can display virtual or soft buttons and a virtual keyboard, which can be used as an input/output device by the user.

Other input controllers 1044 can be coupled to other input/control devices 1048 such as one or more buttons, rocker switches, thumb-wheels, infrared ports, USB ports, and/or a pointer device such as a stylus. The one or more buttons (not shown) can include an up/down button for volume control of speaker 1028 and/or microphone 1030. In some implementations, device 1000 can include the functionality of an audio and/or video playback or recording device and may include a pin connector for tethering to other devices.

Memory interface 1002 can be coupled to memory 1050. Memory 1050 can include high-speed random access memory or non-volatile memory such as magnetic disk storage devices, optical storage devices, or flash memory. Memory 1050 can store operating system 1052, such as Darwin, RTXC, LINUX, UNIX, OS X, ANDROID, WINDOWS, or an embedded operating system such as VxWorks. Operating system 1052 may include instructions for handling basic system services and for performing hardware dependent tasks. In some implementations, operating system 1052 can include a kernel.

Memory 1050 may also store communication instructions 1054 to facilitate communicating with other mobile computing devices or servers. Communication instructions 1054 can also be used to select an operational mode or communication medium for use by the device based on a geographic location, which could be obtained by the GPS/Navigation instructions 1068. Memory 1050 may include graphical user interface instructions 1056 to facilitate graphic user interface processing such as the generation of an interface; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes, camera instructions 1070 to facilitate camera-related processes and functions; and instructions 1072 for any other application that may be operating on or in conjunction with the mobile computing device. Memory 1050 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 1050 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for optimizing memory for a wearable device, the method comprising:
   receiving a selection from a user via a user interface of the wearable device, wherein the selection, identifies a selected device for storing at least one of an application and application data, the received selection also identifying a link to the application or the application data, the selected device selected from a list that includes the wearable device, a user mobile device, and a cloud computer;
   executing instructions stored in memory, wherein execution of the instructions by a processor identifies that the application data associated with the selected application is located at the user mobile device or at the cloud computer identified by the received selection;
   retrieving the application data from the selected device over a communication network via the link identified by the received selection;
   generating a display for display on the user interface of the wearable device based on the retrieved application data, wherein the generated display is associated with execution of the selected application; and
   deleting a portion of the retrieved application data from the wearable device after the user exits the selected application when memory utilization by the selected application at the wearable device corresponds to the user interface displays an indication of a high storage requirement and when the selected device for storing application data is the user mobile device or the cloud computer, the deletion of the portion of the retrieved application data optimizing available memory in the wearable device.

2. The method of claim 1, further comprising determining that the selected application is stored locally at the wearable device, wherein the retrieved application data is used to execute the selected application.

3. The method of claim 2, wherein generating the display comprises executing the selected application stored locally at the wearable device using the retrieved application data.

4. The method of claim 1, further comprising determining that the selected application is stored remotely at the selected device, and wherein the retrieved application data comprises the selected application.

5. The method of claim 4, wherein retrieving the application data from the selected device comprises downloading the selected application to the wearable device.

6. The method of claim 4, wherein the retrieved application data comprises data regarding the display, wherein execution of the selected application by the selected other device generates the data regarding the display.

7. The method of claim 1, further comprising receiving sensor information via a sensor of the wearable device.

8. The method of claim 7, further comprising storing the sensor information locally at the wearable device.

9. The method of claim 8, further comprising transmitting the stored sensor information over the communication network to the selected device.

10. A wearable device for optimizing memory, the wearable device comprising:
    a user interface for receiving a selection from a user, wherein the selection indicates identifies a selected device for storing at least one of an application and application data, the received selection also identifying a link to the application or the application data, the selected device selected from a list that includes the wearable device, a user mobile device, and a cloud computer;
    a processor for executing instructions stored in memory, wherein execution of the instructions by a processor identifies that the application data associated with the selected application is located at the user mobile device or at the cloud computer identified by the received selection; and
    a communication interface for retrieving the application data from the selected device over the communication network via the link identified by the received selection, wherein a portion of the retrieved application data is deleted from the wearable device after the user exits the selected application when memory utilization by the selected application at the wearable device corresponds to a high storage requirement and when the selected device for storing application data is the user mobile device or the cloud computer, the deletion of the portion of the retrieved application data optimizing the available memory in the wearable device.

11. The device of claim 10, further comprising memory, wherein the processor executes further instructions to determine that the selected application is stored locally in the memory of the wearable device, and wherein the processor uses the retrieved application data to execute the selected application.

12. The device of claim 11, wherein the processor generates the display by executing the selected application stored locally at the wearable device using the retrieved application data.

13. The device of claim 10, wherein the processor executes further instructions to determine that the selected application is stored remotely at the selected device, and wherein the retrieved application data comprises the selected application.

14. The device of claim 13, wherein retrieving the application data from the selected device comprises downloading the selected application to the wearable device.

15. The device of claim 13, wherein the retrieved application data comprises data regarding the display, wherein execution of the selected application by the selected device generates the data regarding the display.

16. The device of claim 10, further comprising a sensor that detects information regarding an environment around the sensor.

17. The device of claim 16, further comprising memory for storing the sensor information locally.

18. The device of claim 17, wherein the communication interface further transmits the stored sensor information over the communication network to the selected device.

19. The device of claim 10, further comprising a housing that corresponds to clothing or an accessory configured to be worn by a user.

20. A non-transitory computer-readable storage medium, having embodied thereon a program executable by a processor to perform a method for optimizing memory for a wearable device, the method comprising:

receiving a selection from a user via a user interface of a wearable device, wherein the selection, identifies a selected device for storing at least one of an application and application data, the received selection also identifying a link to the application or the application data, the selected device selected from a list that includes the wearable device, a user mobile device, and a cloud computer;

identifying that the application data associated with the selected application is located at the user mobile device or at the cloud computer identified by the received selection;

retrieving application data from the selected device over a communication network via the link identified by the received selection;

generating a display for display on the user interface of the wearable device based on the retrieved application data; and deleting a portion of the retrieved application data from the wearable device after the user exits the selected application when memory utilization by the selected application at the wearable device corresponds of a high storage requirement and when the selected device for storing application data is the user mobile device or the cloud computer, the deletion of the portion of the retrieved application data optimizing available memory in the wearable device.

\* \* \* \* \*